April 29, 1958     W. E. WALLES     2,832,699
METHOD FOR DESTATICIZING POLYETHYLENE
AND ARTICLES THEREBY OBTAINED
Filed April 30, 1956

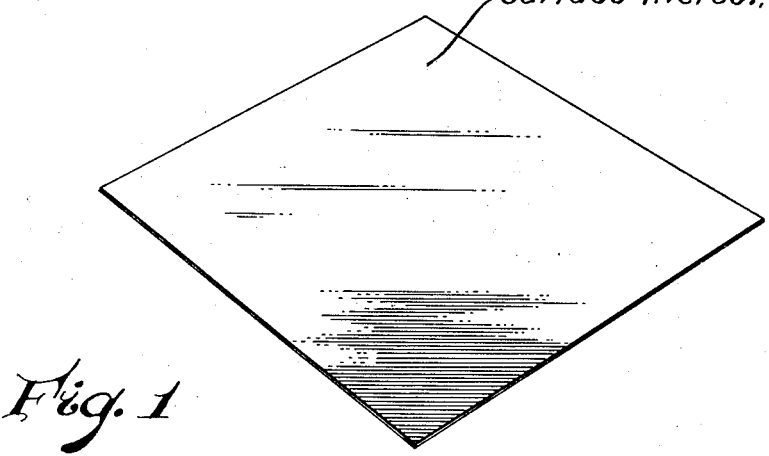

Destaticized polyethylene film having a functionally basic hydrophilic agent applied to sulfonated surface thereof.

Fig. 1

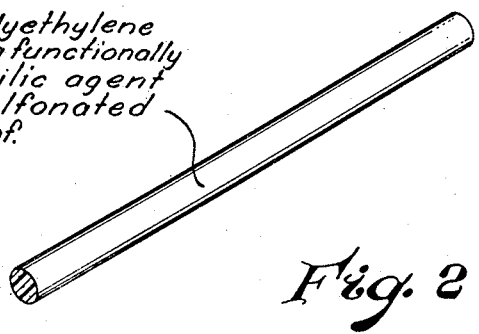

Destaticized polyethylene filament having a functionally basic hydrophilic agent applied to sulfonated surface thereof.

Fig. 2

INVENTOR.
Wilhelm E. Walles
BY
Griswold & Burdick
ATTORNEYS

United States Patent Office 2,832,699
Patented Apr. 29, 1958

2,832,699

METHOD FOR DESTATICIZING POLYETHYLENE AND ARTICLES THEREBY OBTAINED

Wilhelm E. Walles, Midland, Mich., assignor to The Dow Chemical Company, Midland, Mich., a corporation of Delaware Application April 30, 1956, Serial No. 581,556

18 Claims. (Cl. 117—69)

This invention relates to a method for destaticizing polyethylene and shaped articles comprised of polyethylene so as to overcome their propensity for accumulating static electrical charges. It also has reference to the destaticized polyethylene articles thereby obtained.

Polyethylene has many attractive properties which make it desirable for employment in various shaped articles including fibers, filaments, yarns, threads (and fabrics constructed therefrom), ribbons, tapes, foils, films, sheets, molding and the like. Shaped articles from polyethylene, however, exhibit an inordinate capacity for accumulating surface charges of static electricity. This characteristic makes them extremely difficult and unwieldly to manipulate and handle during various manufacturing operations and use applications. It also lessens their attractiveness in other aspects for being employed for many purposes. For example, many individuals may object to the delitescent electrical shocks they may be subject to or the sparks that may be discharged when they serve as the effective grounding means for polyethylene articles when there is a considerable accumulation of electrical charges on the articles. Furthermore, electrostatically charged polyethylene articles display great tendencies to collect dust and dirt and to have undesirably high degrees of soil retentivity. This of course, limits their adaptability for being utilized in a completely satisfactory manner for many upholstery, furnishing, decorative and other uses.

There are many known materials that have been proposed and claimed as possessing the capability, when applied as an antistatic agent, to destaticize synthetic hydrophobic polymeric materials including polyethylene. Most of the known antistatic agents and materials are comprised of molecules that contain both hydrophilic and hydrophobic units or portions therein. The hydrophilic portion of the molecule in such antistatic agents is designed and adapted to attract or retain moisture, or both, which increases the electrical conductivity or reduces the electrical resistivity of the surface on which the agent is attached. The hydrophobic portion of the molecule, which is generally more similar to the usually hydrophobic materials, such as polyethylene, that are desired to be destaticized, is intended to provide the anchoring or attachment of the agent on the surface through the physical influence of so-called Van der Waal's forces or the like in order to permit the desired conductivity-increasing function of the hydrophilic portions of the antistatic agent's molecule to exert its beneficial effect. As is generally comprehended, a surface which is relatively more electrically conductive (or less resistive) is usually more antistatic in nature in that it tends less to accumulate charges of static electricity.

While it would be highly advantageous to effectively and in a substantially permanent manner provide antistatic agents and materials on the surfaces of polyethylene articles, great difficulty has been encountered in achieving such a desideration through the practice of heretofore known techniques. The considerable chemical inertness of polyethylene and the relatively smooth, sleek and impervious surfaces which occur on the vast majority of polyethylene articles usually prevent suitable chemical bonding or physical attachment, or both, from being obtained with the antistatic agents that may be applied thereto. As a consequence, most antistatic agents and materials are not sufficiently substantive for or adherescent on polyethylene articles to avoid having an undesirable susceptibility for being removed upon exposure to various solvents, including water and organic materials.

It would be advantageous and extremely beneficial to provide polyethylene surfaces with hydrophilic substituents that were effectively and substantially permanently attached without being dependent upon mere physical attractions for such purposes or without requiring to be applied while in molecular connection with a hydrophobic unit that is adapted to be physically attracted to the surface. In this way, the usually encountered shortcomings and deficiencies of conventional antistatic agents could be avoided for purposes of destaticizing polyethylene.

Therefore, it is among the principal objects of the present invention to provide an improved destaticizing method for polyethylene articles so that they might be less propense to develop static electric charges. It is also an object of the invention to provide a method for destaticizing polyethylene articles so that the benefits of such treatment are effectively and substantially permanently retained by the article despite rigorous exposure to washing and cleaning with water and organic materials and other solvent exposures. It is among the ancillary objects of the invention to provide destaticized polyethylene articles which result from practice of the method. It is a predominating object of the present invention to accomplish these intendments without detraction from or deletion of the other desirable characteristics and properties of polyethylene.

According to the present invention, all or any desired portion of the surface of polyethylene or a polyethylene article may be destaticized by a method which comprises subjecting the surface of the polyethylene or polyethylene article to the action of a sulfonating reagent selected from the group consisting of concentrated sulfuric acid containing at least about 98 percent by weight of $H_2SO_4$, oleum, anhydrous solutions of oleum and free sulfur trioxide and subsequently applying to the thereby sulfonated surface an agent consisting of a hydrophilic compound that is free from hydrophobic groups and contains a functional basic atom in its molecular arrangement that, preferably, is a nitrogen atom. Advantageously, the sulfonated surface may be washed free from excess sulfonating reagent prior to the application of the hydrophilic agent. Practice of the method of the invention, if carefully conducted, has no adverse effect on pigments and other additaments such as stabilizers and the like which may be dispersed throughout the polyethylene for various purposes. After application of the hydrophilic agent which exerts a desired antistatic influence on the surface of the polyethylene article to which it is firmly attached, the destaticized product may be employed satisfactorily in any application wherein it is desirable for it to be substantially free from surface accumulation of static electrical charges. The functionally basic hydrophilic agent, which, preferably, contains a functionally basic nitrogen atom, is effectively and substantially permanently retained on destaticized polyethylene articles in accordance with the invention.

While the surface sulfonation of the polyethylene may be accomplished with any of the sulfonating agents of the invention, it is usually more advantageous to employ oleum (which is sometimes known as fuming sulfuric acid) containing from trace amounts to about 10 percent by weight of dissolved, free sulfur trioxide. If desired, the oleum can also be employed beneficially in anhydrous solutions with other materials such as acetic anhydride and the like which permit effective quantities of the sulfur trioxide to be available in an amount which is equivalent to that which is provided in the oleum. In certain instances, it may be convenient to employ free sulfur trioxide vapors which, beneficially, may be diluted to a concentration as low as 10 percent or less, for example, with a suitable inert gas such as nitrogen.

Generally, a satisfactory degree of surface sulfonation may be obtained when operating at temperatures between the freezing point of the sulfonating reagent and about 150° C. for periods of time ranging from matters of merely several seconds or even almost instantaneous periods which involve mere fractions of seconds to hours. Frequently, when an oleum is employed which contains dissolved, free sulfur trioxide in amounts ranging from traces to about 10 percent by weight, the surface sulfonation may be performed suitably at an operating temperature of about 50° C. within a time period of about five minutes.

The degree of surface sulfonation which is obtained on the polyethylene article predetermines the relative quantity of the hydrophilic agent that may be effectively and permanently attached thereto upon its subsequent application and, for all practical purposes, precurses the results which may be realized by practice of the invention. The degree of sulfonation that may be obtained in any particular instance is somewhat interdependent on the nature of the polyethylene and the specific physical form or structure of the polyethylene article that is being treated, the strength or effective sulfur trioxide concentration of the reagent, the operating temperature and the length of the treatment. Care should be taken to avoid sulfonation conditions which may be too strong or vigorous, as may occur when an oleum is employed with a relatively high free sulfur trioxide content at too high a temperature or for too long a period of time. Care should also be taken to employ more moderate treating conditions upon more delicate structures such as fine filaments or fibers and the like. If such precautions are not assiduously observed, the polyethylene article may be caused to decompose and degrade resulting in its being darkened and discolored to an intolerable extent. Conversely, optimum destaticizing results may not be obtained if overly weak sulfonating conditions are employed which may not sufficiently modify the surface of the polyethylene article to permit a suitably beneficial quantity of the anti-static agent to be effectively and permanently applied thereto.

The functionally basic hydrophilic agent that may be employed in the practice of the invention may consist of any type of hydrophilic unit that may be desired and that is free from hydrophobic groups. As is apparent, units that have more definitely pronounced hydrophilic tendencies, such as those that may contain a plurality of hydroxyl and equivalent substituents, usually secure a greater destaticizing benefi in the practice of the invention, frequently with application of relatively smaller quantities, than when less hydrophilic units are involved. Preferably, as has been indicated, the basic functionality of the hydrophilic agent is derived from a functionally basic nitrogen atom that is contained in the molecule with the hydrophilic unit as in various amines and the like and in compounds having quaternary ammonium groups such as in alkyl pyridines and the like. If desired however, the basic functionality of the agent may be derived from other than nitrogen atoms as in certain quaternary compounds of phosphorous, arsenic and antimony and in certain ternary sulfur compounds. It may also be derived from oxygen atoms having certain structural characteristics as are present in particular ether linkages. Advantageously, a hydrophilic amine that is free from hydrophobic groups and contains any beneficial hydrophilic unit in its molecule may be utilized. It is generally desirable for the hydrophilic agent to have relatively pronounced hydrophilic characteristics as may be obtained when it contains a hydrophilic unit in the molecule that consists of at least about 3 hydrophilic groups such as hydroxyl groups. This more readily secures a marked destaticizing effect in the polyethylene article upon application of the hydrophilic agent to the sulfonated surface. Some degree of destaticization may be obtained, however, with such relatively low molecular weight amine hydrophilic agents as diethanolamine, triethanolamine, diethylene triamine and the like.

Polyglycol amines, particularly those having a molecular weight of at least about 100 may usually be employed with especial advantage as hydrophilic agents in the practice of the invention. Such polyglycol amines, for example, as glucosamine or as contain in their molecules at least about 3 to 4 recurring glycol units from ethylene or propylene oxide, or both, such as the polyglycol amines which may be obtained from The Dow Chemical Company under the trade-designations "Dow polyglycolamine 3F57" and "Dow polyglycolamine 3F59" or under the trade-name "Dowanol 22 Amine," may generally be utilized with exceptional benefit.

Since the application of the hydrophilic agent on the sulfonated polyethylene surface is essentially in the nature of a metathetical reaction, there is little criticality involved in the conditions of its employment with respect to time, temperature and concentration. It is usually beneficial and convenient, however, to apply it from a relatively low concentration dispersion or solution, as between about 1 and 5 percent by weight, in a suitable liquid medium such as water. This manner of employment permits immersion of the sulfonated polyethylene in an applicating bath of the hydrophilic agent although, if desired, other application techniques may also be utilized for the hydrophilic agent. The extremely effective and substantially permanent retention of the hydrophilic agent by the polyethylene in the practice of the invention is due to the bonding ionic attraction involved between the former and the sulfonated surface of the latter. In practical effect, as it were, the method of the invention destaticizes the hydrophobic polyethylene article by a superficial provision of the necessary hydrophilic material without involving or requiring extraneous and external hydrophobic matter.

Any desired degree of destaticization of the polyethylene article may be effected. Generally, within the limits of beneficial operating conditions, longer and more intense sulfonations permit the subsequent application of greater amounts of the hydrophilic agent to yield products having greater degrees of antistatic characteristics. It is possible, for example, to prepare a polyethylene article that is sufficiently destaticized so as to be substantially completely antistatic in character. Advantageously, the invention may be practiced with fabricated articles including fibers, filaments, yarns, threads, ribbons, tapes, foils, films, sheets, moldings and the like and on materials constructed therefrom such as cloth and fabric from textile fibers, filaments and the like of polyethylene. As indicated, an entire surface need not be destaticized on such fabricated articles as films and moldings or on other articles. If it is not desired or required to obtain the benefit of a completely destaticized surface, only certain preferred areas or portions of a surface may be treated in accordance with the invention.

In the accompanying drawing there is schematically illustrated a sheet in Figure 1 and a filament in Figure 2 as being typical polyethylene articles whose surfaces may advantageously be destaticized in accordance with the present invention.

By way of exemplary illustration, a colored fabric woven from pigmented polyethylene monofilament was immersed in a 3 percent oleum (which contains about 3 percent by weight of free sulfur trioxide dissolved in $H_2SO_4$) at a temperature of about 50° C. for about five minutes. After being sulfonated, the fabric was washed thoroughly in water and then immersed in a 2 percent by weight aqueous solution of glucosamine which was maintained at a temperature of about 50° C. The immersion was continued for about five minutes before the treated fabric was removed from the solution of the hydrophilic agent, washed thoroughly with water and dried. Its surface resistivity was then tested to determine its antistatic characteristics by tautly connecting a sample of the destaticized fabric between two electrodes, each of which were 7 centimeters long, spaced parallel 4 centimeters apart and across which there was applied a 500 volt direct current potential. The test was conducted at room temperature under about 80 percent relative humidity. The surface resistivity of the destaticized fabric was found to be about $10^{10}$ ohm-centimeters. In comparison, untreated polyethylene fabric of the same type has a surface resistivity between about $10^{12}$ and $10^{14}$ ohm centimeters. The destaticized fabric retained its antistatic character without appreciable alteration even after being subjected to water at about 55° C. for ½ hour and to a five minute immersion in acetone.

Similar good results were obtained when 2 percent by weight aqueous solutions of "Dow polyglycolamine 3F57," "Dow polyglycolamine 3F59" and "Dowanol 22 Amine" were employed as hydrophilic agents in place of glycosamine. When diethanolamine was employed in the same manner as a hydrophilic agent in place of glucosamine, the antistatic character of the destaticized fabric was reduced in the neighborhood of 10 percent (expressed in surface resistivity value) from the foregoing. When diethylene triamine, triethanolamine, monoisopropanolamine and guanidine carbonate were employed, a destaticizing effect was obtained although its magnitude was much less pronounced than that achieved with glucosamine.

Similar excellent results may be obtained when other sulfonating conditions within the scope of the invention are employed on the polyethylene and when other polyglycolamines and other functionally basic nitrogen atom-containing and other hydrophilic materials are utilized.

It is to be fully understood that the present invention is to be construed and interpreted not by the foregoing didactic description and specification but in the light of what is set forth and defined in the appended claims.

What is claimed is:

1. Method for destaticizing polyethylene and polyethylene articles which comprises subjecting the surface of the polyethylene to a sulfonating reagent which is selected from the group consisting of concentrated sulfuric acid containing at least about 98 percent by weight of $H_2SO_4$, oleum, anhydrous solutions of oleum and free sulfur trioxide; and subsequently applying to the sulfonated surface an agent consisting of a hydrophilic compound that is free from hydrophobic groups and contains a functional basic atom in its molecular arrangement.

2. The method of claim 1 wherein the sulfonating reagent is comprised of oleum.

3. The method of claim 1 wherein the sulfonating reagent is comprised of oleum that contains from trace amounts to about 10 percent by weight of dissolved, free sulfur trioxide.

4. The method of claim 1 wherein the polyethylene is subjected to the sulfonating reagent at a temperature between the freezing point of the reagent and about 150° C.

5. The method of claim 1 wherein the sulfonating reagent is comprised of oleum that contains from trace amounts to about 10 percent by weight of dissolved, free sulfur trioxide and the polyethylene is subjected to the oleum at a temperature of about 50° C. for about five minutes.

6. The method of claim 1 and including the steps of washing the sulfonated article free from the sulfonating reagent before applying the hydrophilic agent, washing the article after application of the hydrophilic agent, and drying the destaticized article.

7. The method of claim 1 wherein the hydrophilic agent consists of a hydrophilic compound that contains a functional basic nitrogen atom in its molecular arrangement.

8. The method of claim 1 wherein the hydrophilic agent is a hydrophilic amine.

9. The method of claim 1 wherein the hydrophilic agent is a polyglycol amine.

10. The method of claim 1 wherein the hydrophilic agent is glucosamine.

11. Destaticized solid polyethylene having a sulfonated surface to which is applied and bonded an agent consisting of a hydrophilic compound that is free from hydrophobic groups and contains a functional basic atom in its molecular arrangement.

12. The destaticized polyethylene of claim 11 wherein the hydrophilic agent consists of a hydrophilic compound that contains a functional basic nitrogen atom in its molecular arrangement.

13. The destaticized polyethylene of claim 11 wherein the hydrophilic agent is a hydrophilic amine.

14. The destaticized polyethylene of claim 11 wherein the hydrophilic agent is a polyglycolamine.

15. The destaticized polyethylene of claim 11 wherein the hydrophilic agent is glucosamine.

16. A shaped polyethylene article in accordance with claim 11.

17. A polyethylene film in accordance with claim 11.

18. A polyethylene filamentary article in accordance with claim 11.

References Cited in the file of this patent

UNITED STATES PATENTS

| Re. 24,062 | Horton | Sept. 20, 1955 |
|---|---|---|
| 2,255,940 | Rogers | Sept. 16, 1941 |
| 2,400,720 | Staudinger | May 21, 1946 |
| 2,576,980 | Treue | Dec. 4, 1951 |
| 2,626,876 | Carnes | Jan. 27, 1953 |
| 2,727,831 | Dixon | Dec. 20, 1955 |

OTHER REFERENCES

Vojulskii et al.: Doklady Akad. Nauk. S. S. S. R. 73, 747–50 CA 45: 899e.